No. 634,357.　　　　　　　　　　　　　Patented Oct. 3, 1899.
L. L. LOGAN.
CAR BRAKE.
(Application filed Feb. 11, 1899.)

(No Model.)

Witnesses.
Robert Everitt
F. B. Keefer

Inventor.
Lavalette L. Logan.
By James L. Norris
Atty.

THE NORRIS PETERS CO., PHOTO-LITHO., WASHINGTON, D. C.

UNITED STATES PATENT OFFICE.

LAVALETTE L. LOGAN, OF SCRANTON, PENNSYLVANIA.

CAR-BRAKE.

SPECIFICATION forming part of Letters Patent No. 634,357, dated October 3, 1899.

Application filed February 11, 1899. Serial No. 705,307. (No model.)

*To all whom it may concern:*

Be it known that I, LAVALETTE L. LOGAN, a citizen of the United States, residing at Scranton, in the county of Lackawanna and State of Pennsylvania, have invented new and useful Improvements in Car-Brakes, of which the following is a specification.

This invention relates to car-brakes, and has for its object to provide an improved construction and arrangement of radially-acting brake arms or levers, such as described in my former application, Serial No. 694,122, in which the radial arms or levers are partly supported from the car-wheel axles.

The invention consists in radial brake arms or levers of novel construction and in the provision of improved means for supporting the outer ends of said radial arms or levers from the wheel-axles in such manner that the radial brake arms or levers will have a sliding movement in operating the brake, as hereinafter more particularly set forth.

Figure 1:
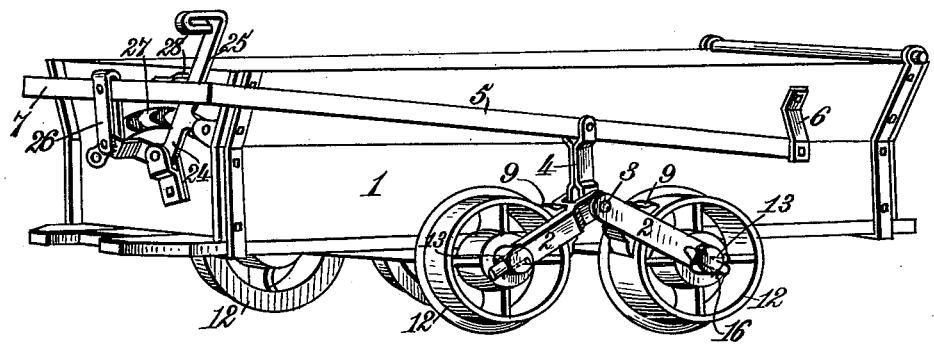
Figure 1:
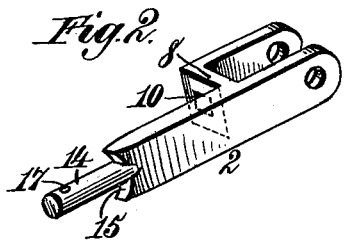
Figure 1:
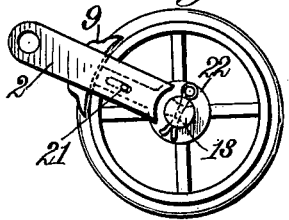
Figure 1:
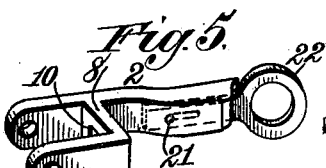
Figure 1:
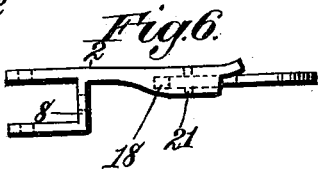
Figure 1:
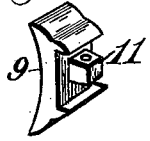
Figure 1:
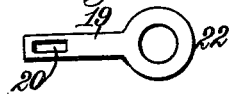
Figure 1:
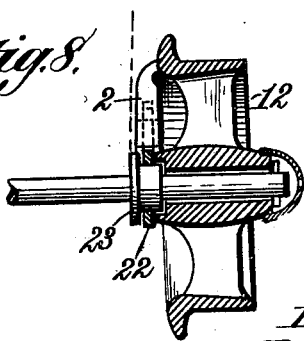

In the annexed drawings, illustrating the invention, Figure 1 is a view of a mine-car, showing one form of my improved radial brake arms or levers slidingly supported at their outer ends from the wheel-axles. Fig. 2 is a view of one of the radial brake arms or levers. Fig. 3 is a view of a brake-shoe. Fig. 4 shows the application of a modified form of radial brake arm or lever to have a sliding engagement with a radial projection or supporting-arm provided on the wheel-axle. Fig. 5 is a perspective of the modified form of radial brake arm or lever and the supporting-arm at the outer end of said lever. Fig. 6 is a plan of the same. Fig. 7 is a view of the supporting-arm detached. Fig. 8 is a transverse section through a car-wheel with its axle arranged for attachment of the modified form of radial brake arm or lever at the inner side of the wheel.

Referring to the drawings, the numeral 1 designates a mine-car mounted on the axles of four wheels.

The brake mechanism comprises pivotally-connected radial brake arms or levers 2, preferably arranged in pairs between the forward and rear wheels on opposite sides of the car. These radial arms or brake-levers 2 are bifurcated at their inner or jointed ends, through which they are pivotally attached, by means of a pin 3, to the lower end of a link 4, depending from a main brake-operating lever 5, that is fulcrumed at one end to a bracket 6, secured to the side of the car. The levers 5 on opposite sides of the car are preferably connected for joint operation by means of a cross-bar 7, extended across one end of the car.

The bifurcated inner or jointed end of each radial arm or brake-lever 2 has one side of its bifurcation offset from the main portion of said lever to form between the ends of said arms or levers a shoulder 8, Figs. 2, 5, and 6, which may be constructed for attachment of a brake-shoe, or, if preferred, this shoulder 8 may be itself utilized as a braking-surface or may have a shoe cast thereon. If a detachable shoe 9, Fig. 3, is preferred, the shoulder 8 may be constructed with an opening 10 to receive a lug 11, formed on said shoe. A pin or other fastening applied to the lug 11 will serve to secure the brake-shoe to the lever or radial arm 2 in such manner as to be readily detachable. It may sometimes be preferable to cast a brake-shoe direct onto the shoulder 8 of the radial arm or lever, and in many cases this shoulder can be itself directly utilized as a braking-surface if made sufficiently heavy. Wooden shoes may also be used, if preferred, in which case they can be fastened to the brake-attaching portion of the radial arms by means of a suitable number of nails or otherwise.

By reference to Fig. 1 it will be seen that by means of the link 4 the jointed inner ends of the radial arms 2 are suspended between the car-wheels 12 in such position that the braking-surfaces can be readily applied to or released from the wheel-rims with a radial movement, the outer ends of said radial arms being in sliding relation with the wheel-axles from which they are supported. As as improved means for obtaining a sliding support for the outer ends of the radial brake-arms from the wheel-axles I prefer to employ a telescopic connection comprising a socket or recess in one part to receive a projection or arm on the other part arranged parallel with the required direction of longitudinal movement for the radial brake-arm. Thus, as shown in Fig. 1, each wheel-axle may be provided beyond the wheel-hub with a socket 13, extended diagonally through the axle-spindle from side to side and formed with double flaring ends, as shown. The outer end of each radial arm 2, as shown in Figs. 1 and 2, may be reduced in thickness to form a tongue or projection 14, that will be capable of a sliding engagement in the axle-socket 13 during the radial movements of the brake arms or levers 2 when actuated by the main operating-lever. At the junction of the tongue 14 with the main portion of the radial brake arm or lever 2 there is a shoulder 15, that takes a bearing against the axle, and thereby prevents the radial arm from wearing at its braking or shoe-attaching surface 8 when the shoe is worn down to its limit or when there is no shoe attached. A pin or cotter 16 is inserted through a hole 17 in the end portion of the tongue 14 to limit the radial movements of the two jointed radial arms 2, so that all the shoes or braking-surfaces will be released together through simultaneous and equal movements of the radial brake-arms when the brakes are let off. It will be observed that the flaring ends of the axle-socket 13 afford sufficient play for the tongue 14, so that it will have no tendency to bind during the movements of the radial arms in applying or releasing the brake.

Instead of employing the socket 13 and tongue 14, as described with reference to Figs. 1 and 2, the outer ends of the radial arms 2 may be supported from the wheel-axles and in sliding relation therewith by providing a socket 18 in the outer portion of each radial arm to receive a supporting-arm or projection 19, that is provided on each wheel-axle. The arm or projection 19 is extended radially from the axle and has in its outer end portion a longitudinally-arranged slot 20 for passage of a pin 21, that is also put through the radial arm for the purpose of allowing each radial arm only a limited amount of endwise movement, so that through simultaneous and equal movement of the radial arms the shoes or braking-surfaces will all be released together when the brake is let off. In this construction the shoulder 15 is located at the outer end of the radial arm and presses against the axle when the shoe is detached or worn down to its limit, thus protecting the radial arms from wear at their shoe-attaching surfaces. Each supporting-arm or projection 19 has at one end a collar 22, which fits neatly over the axle between the linch-pin and the wheel-hub, as shown in Fig. 4, or if it is desired to arrange the radial arms 2 between the wheels and the bed or box of the car the arm or projection 19 will then be fitted onto the axle between the inner side of the wheel-hub and a shoulder or collar 23 on the axle, as shown in Fig. 8.

As shown in Fig. 1, the main brake-levers 5 may be operated through a bell-crank lever 24, fulcrumed to one end of the car and provided with an operating-handle 25. The short arm of the bell-crank lever 24 connects through a link 26 with the cross-bar 7 of the levers 5, through which the brakes are actuated. A ratchet 27 is arranged in position to be engaged by the lever 24 for the purpose of holding said lever in place when the brakes are on or applied to the wheels, and on the cross-bar 7 there may be arranged a catch 28 to engage and hold said lever when the brakes are off.

The radial arms 2 will assume different radial positions when the brakes are applied to the wheels, depending upon the degree of wear to which the shoes may have been subjected. Thus the more the shoes or braking-surfaces are worn the more horizontal will be the position assumed by the radial arms or levers 2 and the greater the mechanical advantage of the brake. The radial arms or levers also operate in such manner that the whole of each rubbing or braking surface is applied to or removed from the tread of the wheel at the same instant.

Obviously the brake mechanism can be put on but one side of the car, if preferred, any suitable rack or other lock being provided to hold the main operating-lever 5 in the position required.

It will be seen that the construction of the radial brake-arms and supporting-link is such that a stable support is afforded against the forces tending to twist the said arms or any forces tending to rotate them about a line drawn through the center of the telescopic or socket supports for the outer ends of said arms from the axles. The joints between the radial arms 2 and links 4 being made wide will better resist the lateral stresses to which the said radial arms or levers are subjected, while the telescopic or socket supports for the outer ends of said arms or levers permit them to have a steady and uniform radial motion for effecting an even application and release of the braking-surfaces.

What I claim as my invention is—

1. In a car-brake, a pair of pivotally-connected radial brake arms or levers suspended at their jointed inner ends between the forward and rear car-wheels and having their outer ends supported from the wheel-axles by telescopic connections therewith, one of said parts being provided with a socket and the other part with a projection to slidingly engage said socket in a direction parallel with the longitudinal movement of a radial brake arm or lever, and each of said radial brake arms or levers being provided between its ends with a braking-surface, substantially as described.

2. In a car-brake, the combination of a pair of pivotally-connected radial brake arms or levers each having a braking-surface between its ends, means for suspending said radial brake arms or levers by their jointed ends between the forward and rear car-wheels, telescopic connections for supporting the outer ends of the radial brake arms or levers from the wheel-axles, each of said connections comprising a socket in one part and a projection on the other part to slidingly engage said socket in a direction parallel with the longitudinal movement of the radial brake arm or lever, and operating mechanism for said radial brake arms or levers, substantially as described.

3. In a car-brake, the combination of connected main brake-operating levers located on opposite sides of a car, links suspended from said main levers between the forward and rear car-wheels, pivotally-connected radial brake arms or levers having their jointed inner ends suspended from said links and their outer ends supported by telescopic connections from the wheel-axles, each of said connections comprising a socket in one part and a projection on the other part to slidingly engage said socket in a direction parallel with the longitudinal movement of the radial brake arm or lever, and braking-surfaces on each of said radial arms or levers, substantially as described.

4. In a car-brake, the combination of radial brake arms or levers provided with laterally-widened and pivotally-connected ends suspended between the forward and rear car-wheels and having their outer ends in telescopic connection with the wheel-axles, the widened portions of said radial arms or levers being provided with braking-surfaces between the ends of said arms or levers, and mechanism for operating said brake arms or levers with a radial movement, substantially as described.

5. In a car-brake, the combination of radial brake arms or levers provided with laterally-widened and pivotally-connected inner ends suspended between the forward and rear car-wheels and having telescopic connections for supporting their outer ends from the wheel-axles in such manner as to permit a limited amount of endwise movement, braking-surfaces carried between the ends of each of said radial arms or levers, and operating mechanism, substantially as described.

6. In a car-brake, the combination with the wheel-axles having sockets extended through from side to side, of pivotally-connected radial brake arms or levers suspended at their jointed inner ends between the forward and rear car-wheels and provided at their outer ends with tongues or projections to slidingly engage in said axle-sockets, substantially as described.

7. In a car-brake, the combination with the wheel-axles, and sockets extended through said axles from side to side, of pivotally-connected radial brake arms or levers suspended at their jointed inner ends between the forward and rear car-wheels and provided at their outer ends with tongues or projections to slidingly engage in said sockets and with means for limiting the radial movement of said brake arms or levers each of which is provided with a braking-surface intermediate its ends, substantially as described.

In testimony whereof I have hereunto set my hand in presence of two subscribing witnesses.

LAVALETTE L. LOGAN.

Witnesses:
HARRY ARTLEY,
D. L. FICKES.